United States Patent
Emek et al.

(10) Patent No.: US 7,562,061 B2
(45) Date of Patent: Jul. 14, 2009

(54) CONTEXT-BASED FAILURE REPORTING FOR A CONSTRAINT SATISFACTION PROBLEM

(75) Inventors: Roy Emek, Tel Aviv (IL); Itai Jaeger, Lavon (IL); Yehuda Naveh, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 276 days.

(21) Appl. No.: 11/380,955

(22) Filed: May 1, 2006

(65) Prior Publication Data

US 2007/0255667 A1 Nov. 1, 2007

(51) Int. Cl.
*G06N 5/02* (2006.01)
(52) U.S. Cl. .............................. 706/47; 706/19; 706/48; 700/33; 700/52; 700/103
(58) Field of Classification Search ........................ None
See application file for complete search history.

(56) References Cited

U.S. PATENT DOCUMENTS

| | | | | |
|---|---|---|---|---|
| 5,276,775 A | * | 1/1994 | Meng | 706/51 |
| 5,617,510 A | * | 4/1997 | Keyrouz et al. | 706/45 |
| 5,671,338 A | * | 9/1997 | Araki et al. | 706/46 |
| 5,812,994 A | * | 9/1998 | Imlah | 706/45 |
| 7,069,537 B2 | * | 6/2006 | Lazarov | 717/104 |
| 7,260,562 B2 | * | 8/2007 | Czajkowski et al. | 706/46 |
| 2002/0169587 A1 | | 11/2002 | Emek et al. | |
| 2005/0021486 A1 | | 1/2005 | Naveh | |
| 2006/0184468 A1 | * | 8/2006 | Adir et al. | 706/16 |
| 2007/0027739 A1 | * | 2/2007 | Connors et al. | 705/9 |
| 2007/0094175 A1 | * | 4/2007 | Axling | 706/19 |

OTHER PUBLICATIONS

U.S. Appl. No. 11/191,080, filed Jul. 28, 2005.
U.S. Appl. No. 11/205,969, filed Aug. 17, 2005.
U.S. Appl. No. 11/205,527, filed Aug. 27, 2005.
U.S. Appl. No. 11/137,949, filed May 26, 2005.
Kambhampati, S. "On the relations between intelligent backtracking and failure-driven explanation-based learning in constraint satisfaction and planning", Source: Artificial Intelligence, v 105, No. 1-2, Oct. 1998, p. 161-208.
Kumar, V., Algorithms for Constraint Satisfaction Problems: A Survey, Source: Artificial Intelligence 13/1, 32-44, 1992.

* cited by examiner

*Primary Examiner*—David R Vincent
*Assistant Examiner*—Omar F Fernandez Rivas (57) ABSTRACT

A method for solving a constraint satisfaction problem (CSP) comprises identifying a first illegal combination associated with at least one variable, wherein the first illegal combination contradicts at least one constraint; grouping the first illegal combination with a second illegal combination, in response to determining that the first and second illegal combinations contradict the same constraint; identifying at least one failure explanation for each group of illegal combinations, wherein the failure explanation is associated with at least one illegal combination in said group to provide a reason for a contradicted constraint associated with the illegal combination; assigning a value to each variable in the given domain to solve the CSP within the limitations defined by the constraints in a solution path; and generating a result, in response to determining that at least one assigned value to a variable contradicts a constraint.

7 Claims, 5 Drawing Sheets

FIG. 4B

CONTEXT-BASED FAILURE REPORTING FOR A CONSTRAINT SATISFACTION PROBLEM

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to solving constraint satisfaction problems and, more particularly, to a system and method for context based failure reporting, such that the reasons for failing to solve a constraint satisfaction problem are provided.

BACKGROUND

Finding the solution to a problem is typically dependent on finding a set of variable values that satisfy a set of predicates or constraints. A problem may be defined by variables X and Y such that $Y=X+2$. The following set of constraints defines the limitations associated with each variable: $0<X<5; Y>5$. A solution to the problem within the boundaries (i.e., domains) defined by the constraints would be: $X=4; Y=6$, for example.

A problem such as the exemplary one provided above is commonly referred to as a constraint satisfaction problem (CSP). Many of the tasks that are addressed by decision-making systems can be framed as CSPs. In such a framework, a task is specified in terms of a problem with a set of variables (each of which can assume values within a given domain) and a set of constraints that the variables must satisfy.

Each constraint may be expressed as a relation, defined over some subset of the variables, denoting valid combinations of their values. As provided in the above example, a solution to the problem is an assignment of a value to each variable, from its respective domain, that satisfies all of the defined constraints. CSPs are useful in a variety of applications, including artificial intelligence, robotic control, test-case generation for software and hardware systems, medical diagnosis, resource allocation, crew scheduling, etc.

An important aspect of the CSP framework in solving complex problems is that the variables and constraints can be defined by multiple people, without requiring each person to be aware of all of the variables and constraints defined by others. In particular, this means that variables and constraints can relate to very different aspects of a complex problem, and may be defined by experts who are intimately familiar with the specifics of each aspect.

For the purpose of this disclosure, an expert is a human user (e.g., a CSP modeler) familiar with structural relationships between the variables and constraints defining the CSP and reasons why assignment of a certain value to a variable may contradict (i.e., not satisfy) a constraint. The expert is distinguishable from another human user (e.g., an end user) who may use the system to find a solution to the CSP.

For example consider the purchase-order of a new car from a manufacturing plant. Possible constraints related to the execution process of the order may be specified by different departments: (1) the manufacturing department may set a constraint such as 'no metallic color is available in the next three months'; (2) the customer's relation department may set another constraint such as 'car must be delivered to VIP customers within one month'; and (3) the sales department may set a constraint such as 'the customer ordered a metallic-colored car'.

Accordingly, a complex problem can be divided amongst a group of experts for the purpose of defining the constraints for specific and exclusive aspects of a complex CSP. A complex CSP can be solved by a computing system referred to as the CSP solver. A CSP solver can be implemented in form of a software program executed over a hardware environment. There are several classes of CSP solvers. One of them is the 'maintain arc-consistency' (MAC) class.

In the MAC approach, the solver examines each constraint independently, and reduces the set of possible values that the variables may accept according to the examined constraint. This process is repeated for all constraints until a solution is found, or until the solver determines that it cannot solve the problem.

When a solver is searching for a solution, constraints originating from the different aspects of the problem, as well as those introduced by different groups of experts, are all considered together on an equal basis without any evaluation of the context in which each constraint is defined. Thus, one problem associated with the MAC process, and CSP solvers in general, is that meaningful relationships between constraints and variables (e.g., particular or relative importance of a given constraint within the context of the problem) are not considered by the solver when generating failure results.

Consequently, when the solver fails to find a solution to a problem, it cannot explicitly specify what aspect of the problem needs to be modified in order for the problem to be solved. For example, consider a CSP that is defined as follows:

$$\text{VARIABLES: } A: [1, 6]; B: [1, 1000]; C: [1, 4]$$
$$\text{CONSTRAINTS: } \text{IF } (A = 1 \text{ OR } A >= 5)$$
$$\text{THEN } B >= 180$$
$$\text{IF } (C <= 2) \text{ THEN } B <= 30$$
$$C = 2$$
$$A = 5 \text{ OR } A = 6$$

Upon failure, a trace outputted by a MAC solver may look like the following:
Consistency: constraint 1: A=[1-6], B=[1-1000], C=[1-4]
Consistency: constraint 2: A=[1-6], B=[1-1000], C=[1-4]
Consistency: constraint 3: A={1-6}, B=[1-1000], C=2
Consistency: constraint 4: A={5, 6}, B=[1-1000], C=2
Consistency: constraint 1: A={5, 6}, B=[180-1000], C=2
Consistency: constraint 2: A={5, 6}, B=[180-1000], C=NULL
FAIL The above detailed trace of the solution process is difficult to analyze, and a user reviewing such result may not be able to understand the cause of failure. This difficulty arises because the trace provides information about multiple constraints in the system and does not semantically distinguish between them. Specifically, the above trace data will not aid users who are only familiar with certain aspects of a problem (i.e., those who do not know how all of the constraints and variables relate to each other).

Thus, methods and systems are needed that can overcome the aforementioned shortcomings by providing explanations for a failure result within the context of the defined constraints and variables.

SUMMARY

The present disclosure is directed to a system and corresponding methods that facilitate generating context-based explanations when a constraint satisfaction problem (CSP) solver fails to find a solution for a CSP. Preferably, the explanations are embedded in the CSP.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for solving a constraint satisfaction problem (CSP) defined by a set of variables and constraints is provided. The constraints define limitations for values that can be assigned to each variable in a given domain to solve the CSP.

The method for solving the CSP preferably comprises identifying a first illegal combination associated with at least one variable, wherein the first illegal combination contradicts at least one constraint; grouping the first illegal combination with a second illegal combination, in response to determining that the first and second illegal combinations contradict the same constraint; and identifying at least one failure explanation for each group of illegal combinations. In one embodiment, the failure explanation is associated with at least one illegal combination in said group to provide a reason for a contradicted constraint associated with the illegal combination.

In accordance with one aspect of the invention, the method further comprises assigning a value to each variable in the given domain to solve the CSP within the limitations defined by the constraints in a solution path; generating a first result, in response to determining that the assigned value to each variable satisfies the constraints; and generating a second result, in response to determining that at least one assigned value to a variable contradicts a constraint. In an exemplary embodiment, the first result comprises a solution to the CSP and the second result comprises the failure explanation.

The method may further comprise identifying the constraint that is contradicted by the assigned value to the variable; identifying the illegal combination associated with the contradicted constraint; and identifying the failure explanation associated with the illegal combination.

The first illegal combination is identified by an expert, i.e., human user familiar with structural relationships between the variables and constraints defining the CSP and reasons why the constraint corresponding to the first illegal combination is not satisfied, and reasons why the first illegal combination may occur in the solution path.

The CSP may be solved several times to generate a plurality of failure explanations in one or more solution paths. The plurality of failure explanations can then be processed to determine most useful (e.g. most commons most important, most difficult, most relevant) failure explanations failure explanations, or any other subset thereof, for the CSP. In one embodiment, a dynamic link to a variable in the failure explanation is embedded in the explanation. The dynamic link is updated according to a change in value of the variable during each solution path.

In an exemplary embodiment, the explanation comprises a reference to a location in the solution path where the assigned value to the variable contradicts the constraint; and the explanation is in a language easily understandable by a human user not familiar with the structural relationships between the variables and constraint defining the CSP.

In accordance with another embodiment, a system for solving a constraint satisfaction problem (CSP) is provided. The system comprises a logic unit for identifying a first illegal combination associated with at least one variable, wherein the first illegal combination contradicts at least one constraint; a logic unit for grouping the first illegal combination with a second illegal combination, in response to determining that the first and second illegal combinations contradict the same constraint; and a logic unit for identifying at least one failure explanation for each group of illegal combinations.

The system may further comprise a logic unit for assigning a value to each variable in the given domain to solve the CSP within the limitations defined by the constraints in a solution path; a logic unit for generating a first result, in response to determining that the assigned value to each variable satisfies the constraints; and a logic unit for generating a second result, in response to determining that at least one assigned value to a variable contradicts a constraint.

In one embodiment, the system further comprises a logic unit for identifying the constraint that is contradicted by the assigned value to the variable; a logic unit for identifying the illegal combination associated with the contradicted constraint; and a logic unit for identifying the failure explanation associated with the illegal combination.

In accordance with yet another embodiment, a computer program product comprising a computer useable medium having a computer readable program is provided. The computer readable program when executed on a computer causes the computer to identify a first illegal combination associated with at least one variable, wherein the first illegal combination contradicts at least one constraint; group the first illegal combination with a second illegal combination, in response to determining that the first and second illegal combinations contradict the same constraint; and identify at least one failure explanation for each group of illegal combinations.

The computer readable program may further cause the computer to assign a value to each variable in the given domain to solve the CSP within the limitations defined by the constraints in a solution path; generate a first result, in response to determining that the assigned value to each variable satisfies the constraints; and generate a second result, in response to determining that at least on assigned value to a variable contradicts a constraint.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements and aspects of the invention that are referenced by the same numerals in different figures represent the same, equivalent, or similar features, elements, or aspects, in accordance with one or more embodiments.

DETAILED DESCRIPTION

The present disclosure is directed to systems and corresponding methods that facilitate solving a constraint satisfaction problem (CSP) defined by one or more variables and constraints. The constraints define limitations for values that can be assigned to each variable in a given domain for the purpose of solving the CSP.

In one embodiment, an expert identifies one or more illegal combinations of values that if assigned to one or more CSP variables will fail to satisfy the constraints. These illegal combinations are then grouped together according to a cause of failure known to the expert. The expert provides an explanation for a given failure in association with the constraints that are unsatisfied. The CSP is then solved by a solver system. If a solution is not found, the solver system outputs one or more context-based explanations indicating the reason for its failure to find a solution.

In the following, numerous specific details are set forth to provide a thorough description of various embodiments of the invention. Certain embodiments of the invention may be practiced without these specific details or with some variations in details. In some instances, certain features are described in less detail so as not to obscure other aspects of the invention. The level of detail associated with each of the elements or features should not be construed to qualify the novelty or importance of one feature over the others.

Figure 1:
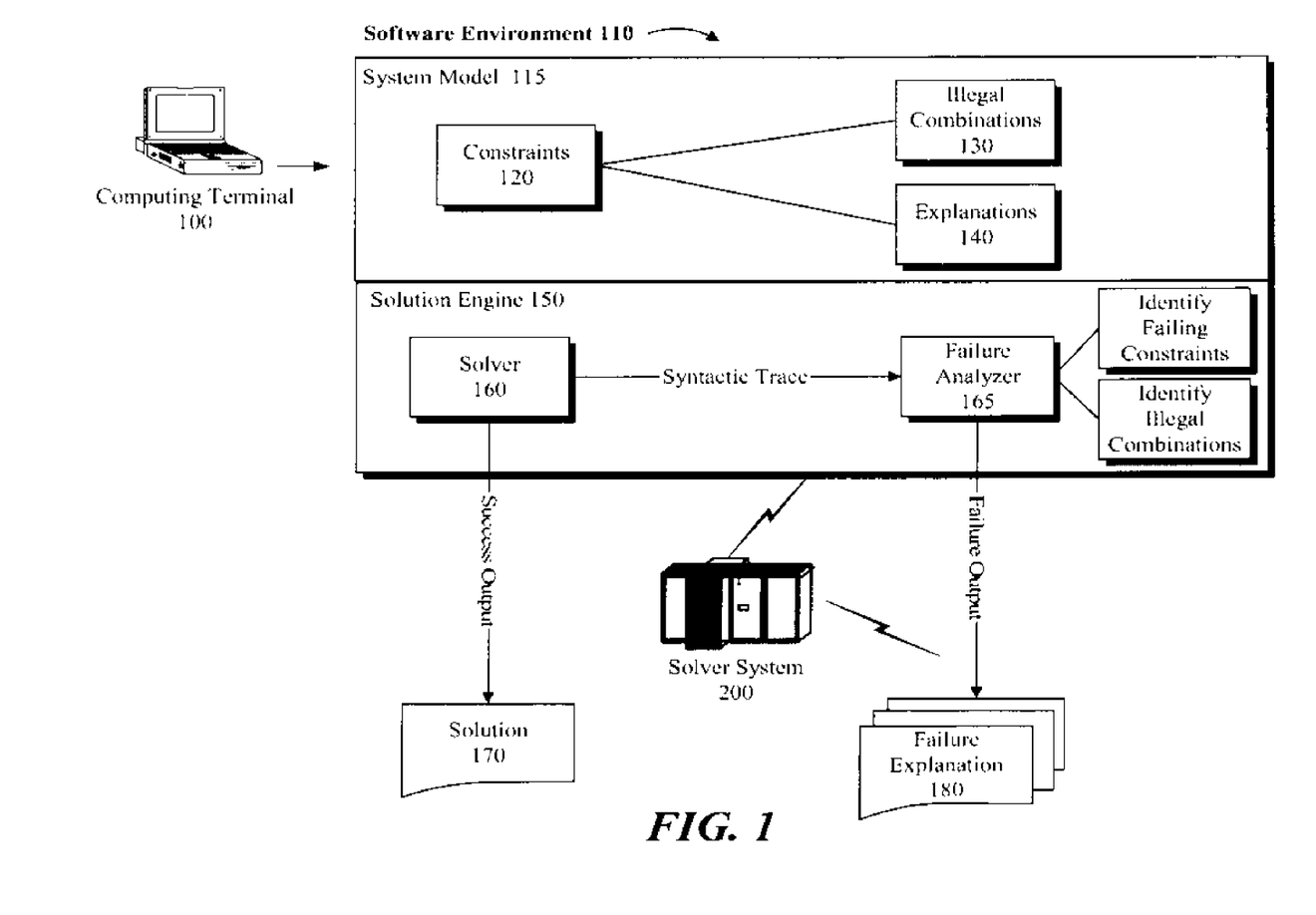
FIG. 1 illustrates an exemplary computing environment in accordance with one or more embodiments of the invention, wherein a constraint satisfaction problem (CSP) can be solved.

Referring to FIG. 1, a solver system 200 and the related software environment 110 for solving a CSP are illustrated, in accordance with an exemplary embodiment. Solver system 200 is built around a solution engine 150, which analyzes a system model 115 that defines a CSP and specific constraints to be applied to the CSP.

The system model 115 is typically expressed in terms of a set of variables and a network of constraints to be applied to those variables. Additional constraints such as domain limitations may be inputted into the system model 115 by an end user using the system to solve a CSP. The constraints may be inputted in various forms (e.g., in the form of user-generated test templates).

The solution engine 150 finds one or more solutions to the CSP by assigning different values to each variable within the context of the constraint network. In other words, each solution found by the solution engine 150 is a concrete solution to a CSP, given values of the variables that satisfy preferably all of the constraints.

In one embodiment, solver system 200 comprises a general-dedicated purpose or dedicated computer, programmed with suitable software, such as software environment 110 to carry out the operations described in more detail below. Software environment 110 is executed on the solver system's 200 hardware environment, and may be provided and installed in electronic form, over a network communication link, or as embedded in tangible media, such as CD-ROM or DVD.

Certain aspects of CSP solver systems are described in U.S. patent application Ser. No. 09/788,152, filed Feb. 16, 2001 (published as US 2002/0169587 A1), the content of which is incorporated herein by reference in entirety. A person skilled in the related art would appreciate that although the exemplary embodiments provided herein are disclosed as applicable to CSP solver systems, the principles of the present invention may be applied in solving a wide range of constraint satisfaction problems.

For example, software environment 110, comprising system model 115 and solution engine 150, may be adapted either in the configuration of a stand-alone computer or integrated with other input and output devices to carry out substantially any operation that can be associated with a constraint network. Example of such operations include, without limitation: controlling a robot based on sensor inputs; analyzing visual or spatial information, parsing natural language input; suggesting medical diagnoses; determining resource allocations and scheduling; and circuit design.

System model 115 for a complex CSP may comprise variables and constraints that can be updated by system experts. System experts are typically people who are intimately familiar with one or more aspects of the system model 115 and associated technical issues. However, individual experts may not necessarily be familiar with all aspects of the system.

Figure 2:
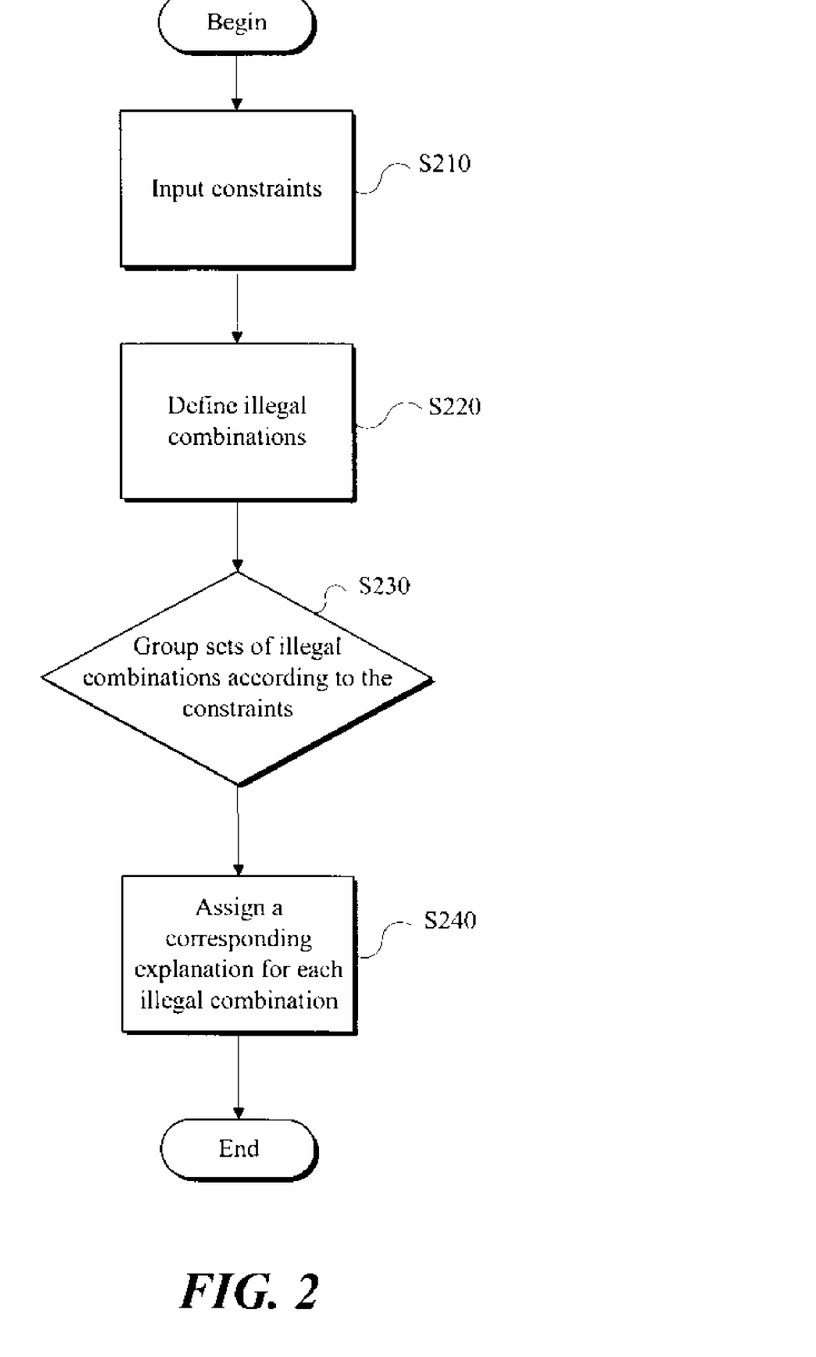
FIG. 2 is a flow diagram of a method for inputting a set of constraints and related explanations to a CSP solver, in accordance with one embodiment.

Referring to FIGS. 1 and 2, one or more system experts can interact with a computing terminal 100 coupled to solver system 200 (e.g., over a network) to provide expert input defining one or more constraints 120 for system model 115 (S210). Constraints 120 may be set by different experts and relate to different aspects of the system. For example, in an automobile manufacturing plant, an expert from the manufacturing department may set a constraint related to the availability of a certain color, while another expert from the customer relations department may set another constraint related to the time associated with the delivery of vehicle to a customer.

In accordance with an exemplary embodiment, an expert may define illegal combinations 130 of variable values that, in the context of the CSP, do not satisfy the constraints 120 (S220). In other words, an expert can identify one or more sets of values that contradict a constraint 120, if the CSP is to be solved according to the assignment of those values to certain variables. A value contradicts a constraint 120 if assignment of the value to a variable results in the constraint not being satisfied.

For the purpose of illustration, in the following we refer to an exemplary CSP which includes three variables and four constraints that define a system model for a production line in a vehicle manufacturing plant with multitudes of constraints associated with various aspects of vehicle manufacturing plant. In this example, the four constraints are related to the fields of manufacturing, customer relations, inventory and sales.

By way of example, three variables A, B, and C are defined within the following domains according to Table 1:

TABLE 1

| | |
|---|---|
| A: [1-6] | A is the color of the car chosen from the set [1-6], where 1: Black, 2: Red, 3: Blue, 4: White, 5: Metallic Red, 6: Metallic Blue |
| B: [1-1000] | B is the time of availability in days |
| C: [1-4] | C is the type of customer chosen from the set [1-4], where 1: Corporate/Government, 2: VIP, 3: Regular, 4: Bargain |

By way of example, the four constraints are defined as follows according to Table 2:

TABLE 2

| | |
|---|---|
| 1) IF (A = 1 OR A >= 5) THEN B >= 180 | The metallic machine is broken, it will take 6 months to fix; Black is postponed by management |
| 2) IF (C <= 2) THEN B <= 30 | VIP and Corporate/Government customers should get the ordered car within one month |
| 3) C = 2 | The customer is identified as VIP |
| 4) A = 5 OR A = 6 | Customer asked for a metallic red or metallic blue car |

Referring to Tables 1 and 2, illegal value combinations for Constraint 1 may be introduced by a manufacturing expert as, for example, "A=1 AND B<180" (indicating that if a Black car is ordered and that car has to be delivered in the next six months, then an illegal combination has occurred). Or, referring to Constraint 2, a customer relations expert may introduce an illegal combination as, for example, "C=1 AND B>30" (indicating that when a Corporate/Government customer orders a car, and that car cannot be delivered in 30 days, then an illegal combination has occurred).

As provided in the above examples, illegal combinations 130 are preferably defined by way parameterization over the ranges that result in an illegal value combination for the variables defining the CSP. Thus, depending on implementation, defining the illegal combinations 130 may or may not consist of an explicit enumeration of every illegal value in the prohibited range.

In accordance with one or more embodiments, an expert preferably groups sets of illegal combinations 130 according to the constraints 120 (S230). That is, the expert groups the defined sets based on what the expert thinks may have caused the illegal combinations 130. Grouping may be based on the knowledge available to the expert according to their background and experience in how a failure may be generated within the context of the illegal combinations identified for each constraint.

Accordingly, an expert may group the illegal combinations 130 into one or more sets, depending on the semantic source of their illegality. The grouping may or may not be based on parameterization over a domain of illegal values, and each set may or may not include all illegal values for each constraint. For example, the two following illegal combinations relating to the exemplary Constraint 1 defined above (linking the color for a car to delivery availability) may be grouped together by a manufacturing expert as provided below:

Illegal combination 1: A=1 AND B<180, indicating that Black color will not be available in the next six months.

Illegal combination 2: A>=5 AND B<180, indicating that no metallic color will be available in the next six months.

In accordance with one aspect of the invention, the expert assigns one or more corresponding explanations 140 for each set of illegal combinations 130 that the expert defines (S240). An explanation 130 preferably comprises a character string (e.g., a sentence) written in a language helpful to an end user (e.g., a non-expert using the solver system 200 to solve a CSP).

An explanation 140 may directly or indirectly define the state and domain of the variables at the time of failure, and one or more indications of why an illegal combination 130 has been detected within a domain. The explanations 140 for each set of illegal combinations 130 may identify one or more causes of failure, some of which may be mutually exclusive. That is, some explanations may offer different possible reasons for a failure, where the reasons may be contradictory to each other.

Accordingly, in one embodiment, explanations 140 are meant to provide an end user with an idea or a hint about what may be the cause of an illegal combination 130 based on the expert's experience. In other words, the end user, by reviewing the explanations 140, will have access to the expert's opinion on why a failure occurred and other related information that may be important or helpful to the end user of which the end user may not be aware. Thus, an explanation may refer to possible ways of modifying constraints 120 to avoid occurrence o illegal combinations 130, so that a solution can be found.

In an exemplary embodiment, the explanations 140 may comprise information about the relationship between the state of an unsatisfied constraint and the state of other defined constraints that are relevant to solving the CSP within the context of the failure detected. An expert may also include in explanations 140 one or more dynamically assigned links (e.g. "tags") to retrieve the real-time values of variables related to a failure.

Inclusion of the tags in the explanations 140 provides more information for an end user to better understand the value, status or availability of a certain variable within the context of the problem being solved. The output may include, for example, a reference to a variable's domain or other related data at the time of failure. Reviewing this data, an end user can more fully appreciate the specific set of values that may have contributed to the failure, and try an alternate set of values to solve the problem, where possible.

Figure 3:
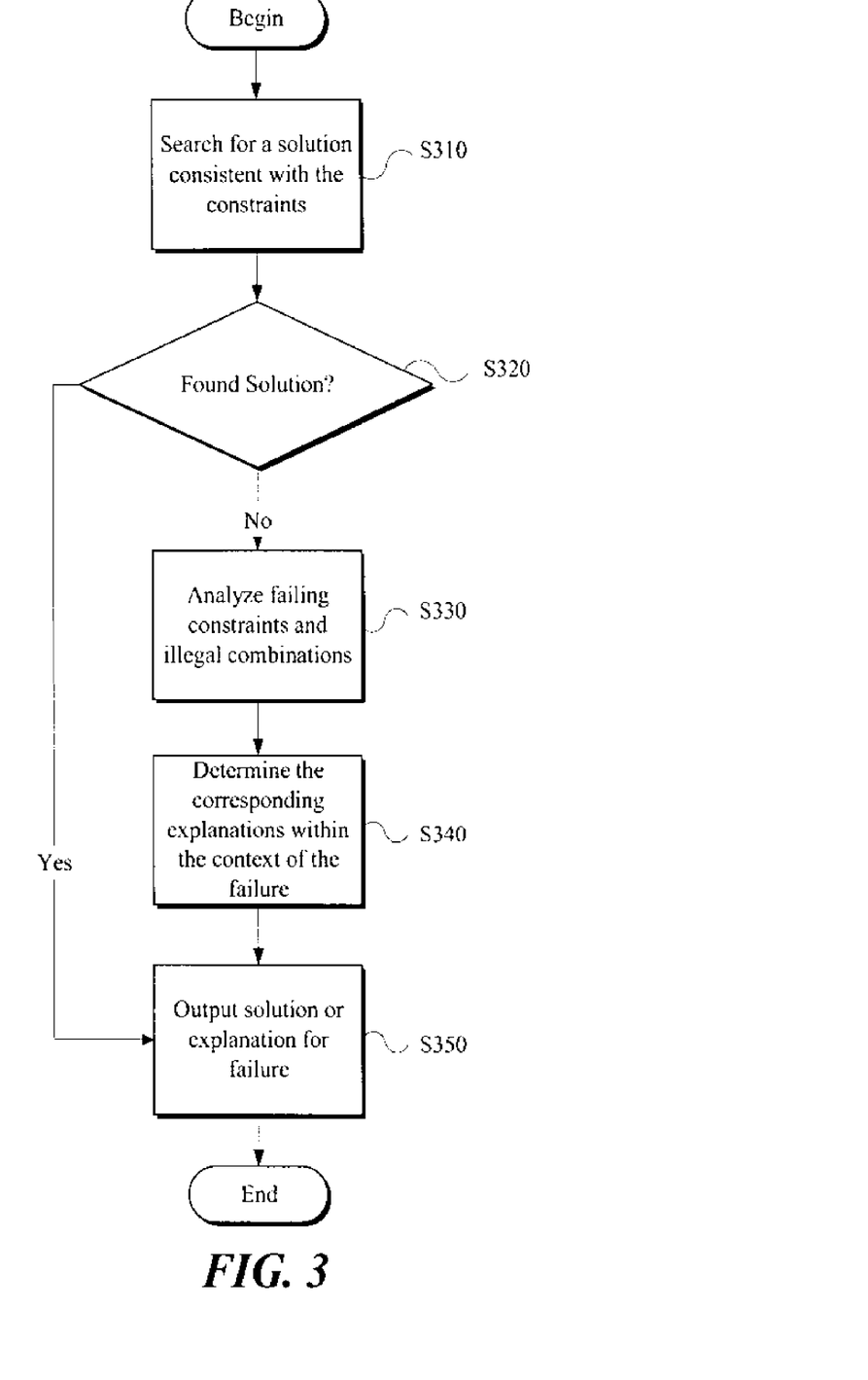
FIG. 3 is a flow diagram of a method of generating a solution or failure result for a CSP, in accordance with an exemplary embodiment.

Referring to FIGS. 1 and 3, an end user can interact with the solver system 200 to solve a CSP based on a set of variable values and constraints. The set of constraints may be pre-defined (e.g., constraints 120 entered by experts) or newly defined by the end user. The end user can provide constraints to the solution engine 150 by way of inputting related data to solver system 200 through a computing terminal 100, for example.

In one embodiment, solver engine 150 comprises a solver 160 and a failure analyzer 165. Solver 160 runs a series of tests to determine if the variables are consistent with the set of constraints defined in the system. In each run, solver 160 preferably searches for a solution that is consistent with all the defined constraints (S310). If solver 160 succeeds in solving the CSP (S320), at least one solution 170 is reported with no reference to any of the modeled explanations (S350). In some embodiments, the solution may include a trace of the solution process and paths searched by solver 160.

If solver 160 fails to find a solution, the failure analyzer 165 analyses the failing constraints and illegal combinations 130 based on a syntactic trace of the paths searched by solver 160 (S330). Failure analyzer 165 identifies the constraints and related illegal combination(s) to determine which constraints led to the failure, as well as the state of variables at the stage of failure.

The identified information relating to the constraints and illegal combinations at this point is syntactic. That is, the value of the constraint or the illegality of a combination by itself does not provide an explanation that easily allows an end user to understand the reason for failure. As such, failure analyzer 165, based on the identified illegal combinations 130 and the set of explanations 140 entered into the system by the experts, determines which explanations correspond to the particular failure and are useful to an end user (S340). It then outputs these pertinent explanations in form of failure explanation 180 (S350).

In one embodiment, failure analyzer 165 matches a detected illegal combination with a list of illegal states provided by the user. Thus, a specific constraint that is not satisfied is associated with the relevant explanations defined by the experts. If no explanation is defined in the system for a detected illegal combination, then a generic message is outputted providing the syntax of the failure. If, on the other hand, the state matches one or more illegal-set, then all matching explanations are reported, in accordance with an exemplary embodiment.

By reviewing the outputted explanation, an end user will have a clear understanding of the reason for failure within the context of the entire system. Therefore, based on the detailed information included in the failure explanation 180, an end user can more easily determine how to relax the constraints in order to find a solution in the next run.

Failure explanations for a single run are typically related to a few constraints defined by the expert or the end user. However, the real reason for a failure may be due to a global inconsistency in the CSP (e.g., due to conflicts in certain system constraints not known to the end user). Therefore, in an exemplary embodiment, the solution engine 150 is run several times to find multiple solutions or a more comprehensive trace for failures.

Solver 160 thus goes through several iterations and solution paths and preferably uses backtracking to find a new path that leads to a solution, if a previous path fails. Going through additional iterations and solution paths results in the recognition of additional failure states for the CSP. The failure analyzer 165 collects and analyzes the related statistics and failure explanations for all failure paths, aggregating the results to find the most common failure paths and the most relevant failure explanations.

To better illustrate the details and the concepts of the invention, we review sample results generated from solving the exemplary CSP defined in Tables 1 and 2 above, based on the following set of explanations associated with certain failure states:

Failure explanations for Constraint 1 (introduced by the manufacturing expert):

A=1 AND B<180

Explanation: By management decision, Black color will not be manufactured during the next six months. Please select a different color, or consider raising the issue with the MBD.

A>=5 AND B<180:

Explanation: No metallic color will be available during the next six months because of a machine malfunction. The simplest way to overcome this is to use the D10XBG Plant in Germany. You may use Corporate Note 102333 to calculate the additional costs incurred when using this plant.

Failure Explanations for Constraint 2 (Introduced by the Customer Relations Expert):

C=1 AND B>30

Explanation: This is a Corporate/Government customer. By contract, we must supply the car in 30 days. Previous delays where sometimes related to the color of the car, and we are not contractually obliged to provide a specific color. Consider changing color.

C=2 AND B>30 AND B<=60

Explanation: This is a VIP customer. By management decision, either the car is ready in 30 days, Or you need to get personal approval from VP Smith. Make your choice. (Run again with checkbox 'approved' selected if approved by VP Smith)

C=2 AND B>60

Explanation: This is a VIP customer. By management decision, the car must be ready in 60 days. Do whatever it takes to achieve this (you may consider talking to manufacturing, which is usually the cause of the delay).

Failure Explanations for Constraint 3 (Introduced by the Inventory Expert):

C≠2

Explanation: This is a VIP customer, please consider all rules related to VIP's and try relaxing any of them.

Failure Explanations for Constraint 4 (Introduced by the sales Expert):

A<5

Explanation: Customer requires a metallic-colored car.

Considering the above variables, constraints and explanations for each illegal combination, solver 160 will fail when it is trying to solve the CSP according to Constraint 2, based on the following input values:

$$A=\{5,6\}, B=[180,1000], C=2$$

Based on the modeled explanations for Constraint 2, solver 160 will generate the following output:

"This is a VIP customer. By management decision, the car must be ready in 60 days. Do whatever it takes to achieve this (you may consider talking to manufacturing, which is usually the cause of the delay)."

Advantageously, when reviewing this output, an end user needs not be aware of the relationship with a particular customer, nor with all the specific rules concerning this particular customer. For example, if the user is a sales person, without the benefit of the content of this output message, he or she may think of countless reasons for the failure, which are not even remotely related to the date of delivery of the car.

Particularly, in the above example, the delivery date originated from the explanation provided by the customer relations expert as related to Constraint 2, without the end user requesting a particular delivery date. Without this information, the end user (e.g., a sale person) would only know that the CSP failed to find a solution. Having the benefit of the provided explanation, the sale person can explain to the customer the reason why the request cannot be satisfied, and work on an alternative request for the customer.

In another scenario, consider that a manager from manufacturing runs the solution engine 150 to determine why the customer's request was not satisfied. When reviewing the failure result, the manager has no idea of the particular aspects of the customer's request which led to the failure. However, since the failure output is documented with a context-based explanation for why the failure occurred, the manager can easily determine that the failure is due to unavailability of the car beyond an acceptable delivery date. The manager may attempt to solve this problem by examining all bottlenecks in the manufacturing process example.

Note that while the modeled explanations in the above examples are provided in English, the explanations can be defined in any language so as to best suit the end user. Thus, the output of the solver system 200, in certain embodiments, can be customized according to the end user's preference, without requiring substantial changes in the structure of system model 115 or solution engine 150.

The following example further illustrates how association of the experts' explanations with a group of illegal constraints makes it easier for the end user to determine the cause of failure. Without the benefit of the experts' explanations, the failure output for Constraint 1 would only include a syntactic trace such as:

color ={metallic red, metallic blue}
availability_time=[180, 1000]
customer_type=VIP Unlike the context-based explanations provided earlier with respect to Constraint 1, it is easy to see that the above syntactic trace gives very little information with respect to the actual cause of the failure. In particular, the above output makes no reference to why the delivery time is larger than 180, nor why the constraint failed at all (i.e., why a VIP customer cannot get a metallic red or blue car within a timeframe of 180-1000 days).

In contrast, the context-based explanations generated by solver system 200 provide the answer to all of the aforementioned questions, indicating that, for example, "Black color will not be manufactured in the next six months" and that "No metallic color will be available in the next six months because of a machine malfunction." In addition, the explanations go even further by providing alternative recommendations for finding a solution, despite of the failure. (See, for example, "Failure explanations for Constraint 1.")

In an embodiment of the invention where dynamic tags are introduced to report value of variables as part of an explanation, the end user will have even more detailed information about the exact value of a variable when an illegal combination is encountered. For example, a modeled explanation of the formal constraint "IF (A<=B) THEN (C<30)" may look like: "I failed because VALUE#1 is larger than 30, while VALUE#2 cannot be made smaller than VALUE#3."

In the above exemplary explanation. VALUE#1, VALUE#2, and VALUE#3 are mapped to the modeled descriptions of the actual variables attached to the formal parameters A, B, and C of the constraint, respectively. The following variables can be associated with the following formal constraints, for example:

---

A -> competitors_prices (modeled description: "competitors' price")
B -> our_prices (modeled description: "our price")
C -> time_of_delivery(modeled description: "time of delivery")

---

Based on the above, an exemplary explanation includes the respective dynamic values for each variable and may appear as "Failure: Time of delivery is larger than 30 while price cannot be made smaller than competitors' prices. Competitors' prices are currently {80000, 85000} and our price are currently 90000."

In different embodiments, the invention can be implemented either entirely in the form of hardware or entirely in the form of software, or a combination of both hardware and software elements. For example, computing terminal 100 and solver system 200 may comprise a controlled computing system environment that can be presented largely in terms of hardware components and software code executed to perform processes that achieve the results contemplated by the system of the present invention.

Figure 4A:
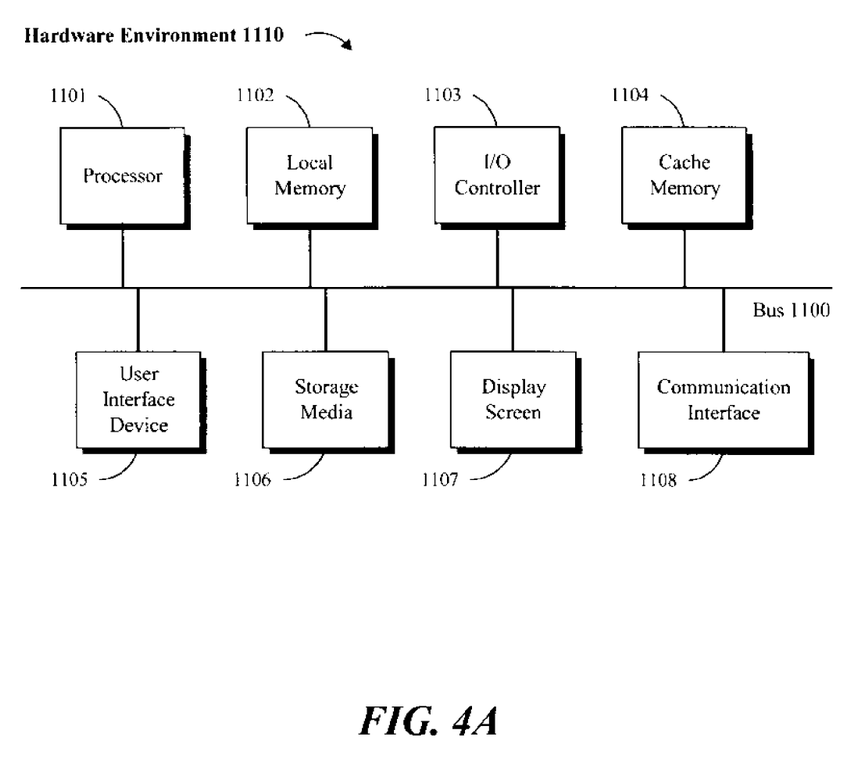
FIGS. 4A and 4B are block diagrams of hardware and software environments in which a system of the present invention may operate, in accordance with one or more embodiments.
Figure 4B:
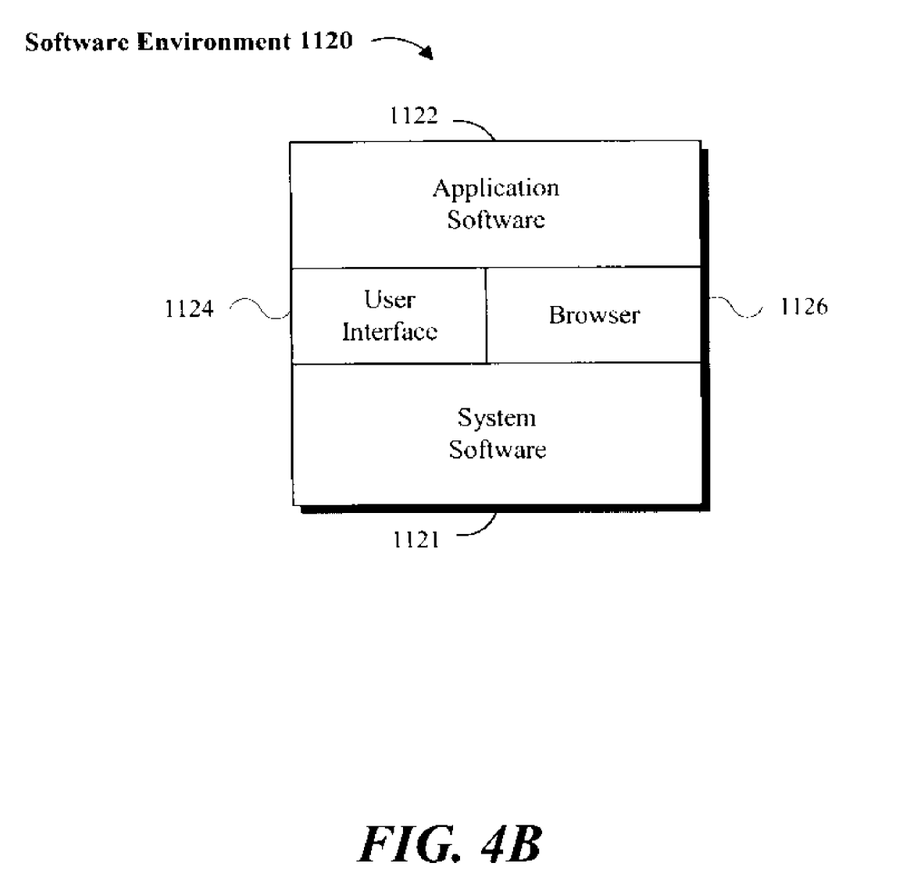

Referring to FIGS. 4A and 4B, a computing system environment in accordance with an exemplary embodiment is composed of a hardware environment 1110 and a software environment 1120. The hardware environment 1110 comprises the machinery and equipment that provide an execution environment for the software; and the software provides the execution instructions or the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors, for example.

Software environment 1120 is divided into two major classes comprising system software 1121 and application software 1122. System software 1121 comprises control programs, such as the operating system (OS) and information management systems that instruct the hardware how to function and process information.

In an exemplary embodiment, solution engine 150 is implemented as application software 1122 executed on one or more hardware environments to solve a CSP, as provided earlier. Application software 1122 may comprise, but is not limited to: program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 4A, an embodiment of the application software 1122 can be implemented as computer software in the form of computer readable code executed on a data processing system such as hardware environment 1110 that comprises a processor 1101 coupled to one or more memory elements by way of a system bus 1100. The memory elements, for example, can comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In some embodiments of the system, communication interface 1108 communicates with other systems by sending and receiving electrical, electromagnetic or optical signals that carry digital data streams representing various types of information including program code. The communication may be established by way of a remote network (e.g. the Internet), or alternatively by way of transmission over a carrier wave.

Referring to FIG. 4B, application software 1122 can comprise one or more computer programs that are executed on top of system software 1121 after being loaded from storage media 1106 into local memory 1102. In a client-server architecture, application software 1122 may comprise client software and server software. For example, in one embodiment of the invention, client software is executed on computing terminal 100 and server software is executed on solver system 200.

Software environment 1120 may also comprise browser software 1126 for accessing data available over local or remote computing networks. Further, software environment 1120 may comprise a user interface 1124 (e.g., a Graphical User Interface (GUI)) for receiving user commands and data. Please note that the are and software architectures and environments described above are for purpose of example, and one or more embodiments of the invention may be implemented over any type of system architecture or processing environment.

It should also be understood that the logic code, programs, modules, processes, methods and the order in which the respective steps of each method are performed are purely exemplary. Depending on implementation, the steps can be performed in any order or in parallel, unless indicated otherwise in the present disclosure. Further, the logic code is not related or limited to any particular programming language, and may comprise of one or more modules that execute on one or more processors in a distributed, non-distributed or multi-processing environment.

The present invention has been described above with reference to exemplary features and embodiments. Those skilled in the art will recognize, however, that changes and modifications may be made in these embodiments without departing from the scope of the present invention. These and various other adaptations and combinations of the embodiments disclosed are within the scope of the invention and are further defined by the claims and their full scope of equivalents.

What is claimed is:

1. A computer-implemented method for solving a constraint satisfaction problem (CSP) comprising:
   defining a constraint satisfaction problem (CSP) as a set of one or more variables and constraints;
   determining whether there is at least a first solution to the problem by generating one or more combinations of assignments, wherein each combination of assignments assigns values to one or more of the variables;
   providing an end user with at least one solution to the CSP, in response to determining that the CSP has at least one solution; and
   in response to determining that the problem has no solution:
   grouping the combinations of assignments according to causes of failure, wherein each cause of failure is based on at least one constraint not being satisfied; and
   providing the end user with an explanation of the causes of failure in a format easily understood by the end user.

2. The method of claim 1, wherein the explanation originates from an expert familiar with structural relationships between the variables and constraints defining the CSP.

3. The method of claim 2, wherein the expert is also familiar with reasons why the first illegal combination may occur in the solution path.

4. The method of claim 1, further comprising:
   solving the CSP several times to generate a plurality of explanations for one or more solution paths; and
   processing the plurality of explanations to determine most useful explanations for the CSP.

5. The method of claim 4, further comprising embedding a dynamic link to a variable in the plurality of explanations, wherein the dynamic link is updated according to a change in value of the variable during each of the solution paths.

6. The method of claim 1, wherein the explanation comprises a reference to a location in the solution path where the first value fails to satisfy the first constraint.

7. The method of claim 1, wherein the explanation is provided in language easily understandable by the end user who is not familiar with the structural relationships between the variables and constraints defining the CSP.

* * * * *